United States Patent
Jeong et al.

(10) Patent No.: US 11,908,133 B2
(45) Date of Patent: Feb. 20, 2024

(54) METHOD FOR CELL IMAGE SEGMENTATION USING SCRIBBLE LABELS, RECORDING MEDIUM AND DEVICE FOR PERFORMING THE METHOD

(71) Applicant: Korea University Research and Business Foundation, Seoul (KR)

(72) Inventors: Won-Ki Jeong, Seoul (KR); Hyunsoo Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 386 days.

(21) Appl. No.: 17/477,827

(22) Filed: Sep. 17, 2021

(65) Prior Publication Data
US 2022/0101522 A1 Mar. 31, 2022

(30) Foreign Application Priority Data
Sep. 25, 2020 (KR) .................. 10-2020-0124696

(51) Int. Cl.
*G06T 7/00* (2017.01)
*G06T 7/11* (2017.01)
(Continued)

(52) U.S. Cl.
CPC .......... *G06T 7/0012* (2013.01); *G06N 20/20* (2019.01); *G06T 5/002* (2013.01); *G06T 7/11* (2017.01);
(Continued)

(58) Field of Classification Search
CPC ......... G06T 7/0012; G06T 7/194; G06T 7/11; G06T 5/002; G06T 2207/20076;
(Continued)

(56) References Cited

U.S. PATENT DOCUMENTS 11,568,627 B2 * 1/2023 Price ................ G06V 10/26
2016/0077007 A1 3/2016 Demos et al.
(Continued)

FOREIGN PATENT DOCUMENTS

| KR | 10-2010-0116404 A | 11/2010 |
|---|---|---|
| KR | 10-1914244 B1 | 11/2018 |
| KR | 10-2084683 B1 | 3/2020 |

OTHER PUBLICATIONS

Ji, Zhanghexuan, et al. "Scribble-based hierarchical weakly supervised learning for brain tumor segmentation." Medical Image Computing and Computer Assisted Intervention—MICCAI 2019: 22nd International Conference, Shenzhen, China, Oct. 13-17, 2019, Proceedings, Part III 22. 2019 (Year: 2019).*

(Continued)

*Primary Examiner* — Utpal D Shah
(74) *Attorney, Agent, or Firm* — NSIP Law

(57) ABSTRACT

A cell image segmentation method using scribble labels includes iteratively pre-training via an image segmentation network (U-Net) using a cell image and scribble labels indicating a cell region and a background region as training data, calculating an exponential moving average (EMA) of image segmentation prediction probabilities at a predetermined interval during the pre-training, self-training by assigning the cell region and the background region for which the EMA of image segmentation prediction probabilities is over a preset threshold to be a pseudo-label, and iteratively refining the image segmentation prediction probability based on a scribbled loss ($L_{sp}$) obtained through a result of the training and an unscribbled loss ($L_{up}$). Accordingly, it is possible to achieve cell image segmentation with high reliability using only scribble labels.

11 Claims, 5 Drawing Sheets

(51) Int. Cl.
  *G06T 7/194* (2017.01)
  *G06T 5/00* (2006.01)
  *G06N 20/20* (2019.01)

(52) U.S. Cl.
  CPC .... *G06T 7/194* (2017.01); *G06T 2207/20076* (2013.01); *G06T 2207/20081* (2013.01); *G06T 2207/20216* (2013.01); *G06T 2207/30024* (2013.01)

(58) Field of Classification Search
  CPC . G06T 2207/20081; G06T 2207/20216; G06T 2207/30024; G06N 20/20
  See application file for complete search history.

(56) References Cited

U.S. PATENT DOCUMENTS

2020/0167930 A1\* 5/2020 Wang ...................... G06N 3/08
2022/0012890 A1\* 1/2022 Wu ........................ G06T 7/0012

OTHER PUBLICATIONS

Harada, Daisuke, et al. "Scribbles for metric learning in histological image segmentation." 2019 41st Annual International Conference of the IEEE Engineering in Medicine and Biology Society (EMBC). IEEE, 2019. (Year: 2019).\*

\* cited by examiner

METHOD FOR CELL IMAGE SEGMENTATION USING SCRIBBLE LABELS, RECORDING MEDIUM AND DEVICE FOR PERFORMING THE METHOD

CROSS-REFERENCE TO RELATED APPLICATIONS

This application claims priority under 35 U.S.C. § 119 to Korean Patent Application No. 10-2020-0124696, filed on Sep. 25, 2020, in the Korean Intellectual Property Office, the disclosure of which is incorporated herein by reference in its entirety.

TECHNICAL FIELD

The present disclosure relates to a cell image segmentation method using scribble labels, and a recording medium and a device for performing the same, and more particularly, to cell segmentation with consistency through self-generating pseudo-labels using only a few scribble labels based on deep learning.

BACKGROUND

Micro- to nano-scale microscopy images are commonly used for cellular-level biological image analysis. In cell image analysis, segmentation serves as a crucial task to extract the morphology of the cellular structures. The conventional cell segmentation methods are mostly grounded in model-based and energy minimization methods. However, a major challenge in energy-based image segmentation methods is effective segmentation of clustered cells.

The recent success of deep learning has gained much attention in many image processing and computer vision tasks. A common approach to achieve highly accurate segmentation performance is to train deep neural networks using ground-truth labels.

However, generating a sufficient number of ground-truth labels is time-consuming and labor-intensive, which is becoming a major bottleneck in the segmentation process. Additionally, the deep learning based image segmentation method needs labels indicating the entire region of cells, requiring high costs to build datasets.

Additionally, manually generated segmentation labels are prone to errors due to the difficulty in drawing pixel-level accurate region masks. To address such problems, cell segmentation methods using point annotations have recently been proposed.

However, even though point annotation is much easier to generate compared to full region masks, the existing work requires point annotations for the entire dataset. Moreover, the performance of cell segmentation through point annotations is highly sensitive to the point location.

Recently, weakly-supervised learning using scribble annotations, i.e., scribble-supervised learning, has actively been studied in image segmentation as a promising direction for lessening the burden of manually generating training labels. The scribble-supervised learning exploits scribble labels and regularized networks with standard segmentation techniques or additional model parameters.

However, the existing image segmentation method through scribble-supervised learning needs pre-processing and post-processing procedures requiring high computational costs such as Graph-Cut and DenseCRF.

RELATED LITERATURES

Patent Literatures (Patent Literature 0001) KR 10-2084683 B1
(Patent Literature 0002) KR 10-2010-0116404 A Non-Patent Literatures (Non-Patent Literature 0001) Hyeonsoo Lee, Won-Ki Jeong, Scribble2Label: Scribble-Supervised Cell Segmentation via Self-Generating Pseudo-Labels with Consistency, arXiv:2006.12890, 23 Jun. 2020
(Non-Patent Literature 0002) Tang, M., Perazzi, F., Djelouah, A., Ben Ayed, I., Schroers, C., Boykov, Y.: On regularized losses for weakly-supervised cnn segmentation. In: Proceedings of the European Conference on Computer Vision (ECCV). pp. 507-522 (2018)

SUMMARY

The present disclosure is aimed at addressing this issue, and therefore the present disclosure is directed to providing a cell image segmentation method with reliability using scribble labels.

The present disclosure is further directed to providing a recording medium having stored thereon a computer program for performing the cell image segmentation method using scribble labels.

The present disclosure is further directed to providing a device for performing the cell image segmentation method using scribble labels.

A cell image segmentation method using scribble labels according to an embodiment for achieving the above-described object of the present disclosure includes iteratively pre-training via an image segmentation network (U-Net) using a cell image and scribble labels indicating a cell region and a background region as training data, calculating an exponential moving average (EMA) of image segmentation prediction probabilities at a predetermined interval during the pre-training, self-training by assigning the cell region and the background region for which the EMA of image segmentation prediction probabilities is over a preset threshold to be a pseudo-label, and iteratively refining the image segmentation prediction probability based on a scribbled loss ($L_{sp}$) obtained through a result of the training and an unscribbled loss ($L_{up}$).

In an embodiment of the present disclosure, the pre-training may include predicting the scribbled loss ($L_{sp}$) by applying a standard cross entropy loss to only labeled pixels.

In an embodiment of the present disclosure, the pre-training may be iteratively performed until a preset epoch is reached.

In an embodiment of the present disclosure, in the pre-training step, scribbled pixels indicating the cell region and the background region may include pixels of 10% or less of the cell image.

In an embodiment of the present disclosure, calculating the EMA of image segmentation prediction probabilities may include automatically generating labels for unlabeled pixels using the EMA of image segmentation prediction probabilities.

In an embodiment of the present disclosure, calculating the EMA of image segmentation prediction probabilities may include averaging every $\gamma$ epoch which is an interval of a prediction ensemble process of the scribbled loss ($L_{sp}$) and the unscribbled loss ($L_{up}$).

In an embodiment of the present disclosure, the self-training may include removing noise in pseudo labels through pseudo labeling and label filtering.

In an embodiment of the present disclosure, the self-training may include periodically predicting the unscribbled loss ($L_{up}$).

In an embodiment of the present disclosure, iteratively refining the image segmentation prediction probability may include applying a relative weight to the unscribbled loss ($L_{up}$).

A computer-readable storage medium according to an embodiment for achieving another object of the present disclosure has recorded thereon a computer program for performing the cell image segmentation method using scribble labels.

A cell image segmentation device using scribble labels according to an embodiment for achieving still another object of the present disclosure includes a warm-up unit to iteratively pre-train via an image segmentation network (U-Net) using a cell image and scribble labels indicating a cell region and a background region as training data, a probability prediction unit to calculate an EMA of image segmentation prediction probabilities at a predetermined interval during the pre-training, a self-training unit to self-train by assigning the cell region and the background region for which the EMA of image segmentation prediction probabilities is over a preset threshold to be a pseudo-label, and a refinement unit to iteratively refine the image segmentation prediction probability based on a scribbled loss ($L_{sp}$) obtained through a result of the training and an unscribbled loss ($L_{up}$).

According to the cell image segmentation method using scribble labels, cell segmentation with high reliability using only scribble labels is proposed, thereby dramatically reducing the time and cost required to build datasets. Additionally, the present disclosure does not use an additional image processing method, thereby reducing the computational costs.

DETAILED DESCRIPTION OF EMBODIMENTS

Figure 1:
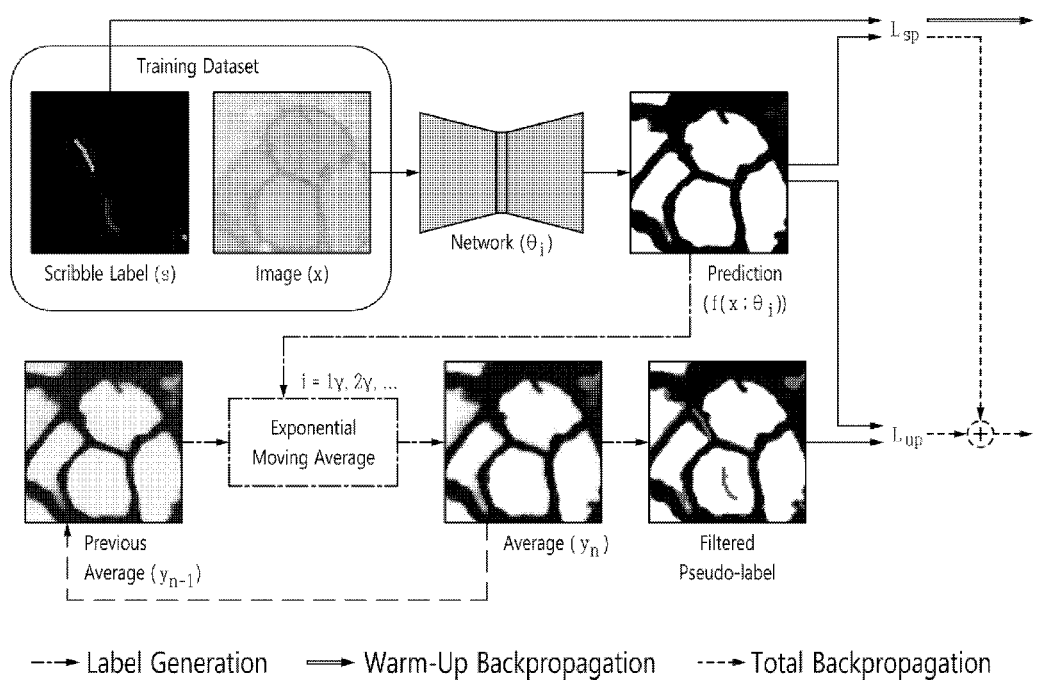
FIG. 1 is a conceptual diagram showing the overview of cell image segmentation using scribble labels according to the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, preferred embodiments of the present disclosure will be described in detail with reference to the accompanying drawings.

Figure 2:
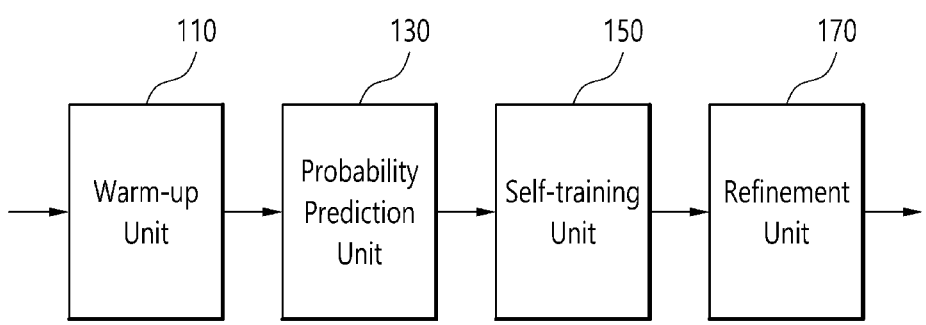
FIG. 2 is a block diagram of a cell image segmentation device using scribble labels according to an embodiment of the present disclosure.

FIG. 1 is a conceptual diagram showing the overview of cell image segmentation using scribble labels according to the present disclosure. FIG. 2 is a block diagram of a cell image segmentation device using scribble labels according to an embodiment of the present disclosure.

Referring to FIG. 1, the present disclosure proposes a cell segmentation framework exploiting only a handful of scribble annotations without full segmentation labels. To this end, the present disclosure combines pseudo labeling and label filtering to generate reliable labels from weak supervision, and leverages the consistency of predictions by iteratively averaging the predictions to improve pseudo labels.

The present disclosure uses scribble annotations as in the existing scribble-supervised learning methods, but proposes the combination of pseudo labeling and label filtering to progressively generate full training labels from a few scribble annotations. By doing this, it is possible to effectively remove noise in pseudo labels and improve prediction accuracy.

Additionally, the present disclosure introduces a novel iterative segmentation network training process that automatically generates training labels via weak-supervision using only a small set of manual scribbles, which significantly reduces the manual effort in generating training labels. Additionally, the present disclosure exploits the consistency by combining pseudo labeling and label filtering. Through this, it is possible to generate reliable training labels which results in a highly accurate and robust performance.

Referring to FIG. 2, the cell image segmentation device 10 using scribble labels (hereinafter the device) according to the present disclosure includes a warm-up unit 110, a probability prediction unit 130, a self-training unit 150 and a refinement unit 170.

The device 10 of the present disclosure may install and run software (application) for performing cell image segmentation using scribble labels, and the warm-up unit 110, the probability prediction unit 130, the self-training unit 150 and the refinement unit 170 may be controlled by the software for performing cell image segmentation using scribble labels, running on the device 10.

The device 10 may be a separate terminal or module(s) of the terminal. Additionally, the warm-up unit 110, the probability prediction unit 130, the self-training unit 150 and the refinement unit 170 may be formed as an integrated module or at least one module. However, to the contrary, each component may be formed as a separate module.

The device 10 may be mobile or fixed. The device 10 may be in the form of a server or an engine, and may be interchangeably called as device, apparatus, terminal, user equipment (UE), mobile station (MS), wireless device and handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

Figure 3:
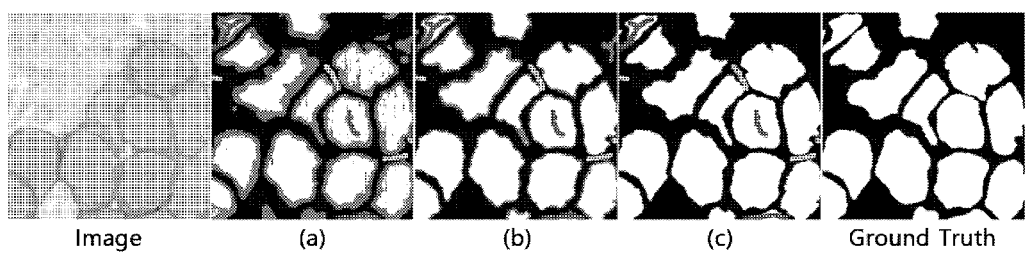
FIG. 3 is a diagram showing an example of iterative refinement of pseudo labels during self-training according to the present disclosure.

FIG. 3 is a diagram showing an example of iterative refinement of pseudo labels during self-training according to the present disclosure.

Referring to FIG. 3, blue and yellow represent scribbles $\Omega_s$ for cells and background, respectively, and red represents pixels below the consistency threshold $\tau$, which will be ignored when calculating the unscribbled pixel loss $L_{up}$. White and black represent cell or background pixels over $\tau(\Omega_g)$.

(A) to (C) of FIG. 3 represent the filtered pseudo-labels from the predictions over the iterations (with Intersection over Union [IoU] score). (A) of FIG. 3 shows the result of prediction at 7th (0.5992) iteration, (B) shows the result of prediction at 20th iteration (0.8306) and (C) shows the result of prediction at 100th iteration (0.9230). The actual scribble thickness used in the experiment is 1 pixel, but it is widened to 5 pixels in FIG. 3 for better visualization.

Unlike the existing scribble-supervised segmentation methods, the present disclosure is an end-to-end scheme that does not require any additional model parameters or external segmentation methods (for example, Graph-cut, DenseCRF) during training. The present disclosure is the first scribble-supervised segmentation method applied to the cell segmentation problem in various microscopy images.

The warm-up unit 110 iteratively pre-trains via an image segmentation network (U-Net) using a cell image and scribble labels indicating a cell region and a background region as training data.

The input sources for the present disclosure are the image x and the scribbles s. The scribbles s may be user-given ones. Here, the given scribbles are defined as labeled pixels (indicated in blue and yellow for the foreground and the background, respectively), and the rest of the pixels are defined as unlabeled pixels (indicated in black).

For labeled (scribbled) pixels, a standard cross-entropy loss is applied. For unlabeled (unscribbled) pixels, the network automatically generates reliable labels using the exponential moving average of predictions during training.

In the present disclosure, model training is composed of two stages. The first stage is initialization (for example, a warm-up stage) by training the model using only the scribbled pixel loss $L_{sp}$. Once the model is initially trained via the warm-up stage, the prediction is iteratively refined by both the scribbled loss $L_{sp}$ and the unscribbled loss $L_{up}$.

The probability prediction unit 130 calculates the exponential moving average (EMA) of image segmentation prediction probabilities at a predetermined interval during the pre-training.

In the present disclosure, the pseudo-label is generated from the average of predictions, and $L_{sp}$ is calculated with the scribble annotation and $L_{up}$ is calculated with the filtered pseudo-label. The prediction ensemble process occurs every $\gamma$ epoch, where $\gamma$ is the ensemble interval. n represents how many times the predictions are averaged.

At the beginning of the warm-up stage, there are only a small set of user-drawn scribbles for input training data. During the first few iterations (warm-up stage), the model is trained only using the given scribbles, and the average of predictions which can be used in the following stage is generated.

Here, the given scribbles are a subset of the corresponding mask annotation. By ignoring unscribbled pixels, the proposed network is trained with the cross entropy loss as shown in the following Equation 1.

$$\mathcal{L}_{sp}(x, s) = -\frac{1}{|\Omega_s|} \sum_{j \in \Omega_s} [s_j \log(f(x; \theta_i)) + (1 - s_j)\log(1 - f(x; \theta_i))]$$ [Equation 1]

Here, x is an input image, s is a scribble annotation, and $\Omega_s$ is a set of scribbled pixels. $f(x; \theta_i)$ is the model's prediction at iteration i. This warm-up stage continues until the warm-up Epoch EW is reached.

Moreover, the EMA of the predictions over the training process is periodically calculated as shown in the following Equation 2.

$$y_n = \alpha f(x; \theta_i) + (1-\alpha)y_{n-1}$$ [Equation 2]

Here, $\alpha$ is the EMA weight, and y is the average of predictions. $y_0 = f(x; \theta_1)$ and n is how many times the predictions are averaged. This process is called a prediction ensemble. Since data augmentation for training is used, segmentation prediction is not consistent for the same input image.

To solve this problem, a solution of the present disclosure is to split into training and ensemble steps. In the ensemble phase, an un-augmented image is used for the input to the network, and EMA is applied to the corresponding predictions.

Moreover, in the scribble-supervised setting, the predictions cannot be ensemble when the best model is found because the given label is not fully annotated. To achieve the valuable ensemble and reduce computational costs, the predictions are averaged every $\gamma$ epoch. Here, $\gamma$ is the ensemble interval.

The self-training unit 150 self-trains by assigning cell and background regions for which the EMA of segmentation prediction probabilities is over a preset threshold to be a pseudo-label.

The refinement unit 170 iteratively refines the segmentation prediction probability based on the scribbled loss $L_{sp}$ obtained through a result of the training and the unscribbled loss $L_{up}$.

Hereinafter, the training of the self-training unit 150 using the self-generated pseudo labels and the probability refinement of the refinement unit 170 using the results will be described.

The average of the predictions can be obtained after the warm-up stage. This can be used for generating a reliable pseudo-label of unscribbled pixels. For filtering the pseudo-label, the average is used.

The pixels with consistently the same result are one-hot encoded and used as a label for unscribbled pixels with standard cross entropy. Using only reliable pixels and making these one-hot encoded progressively provide benefits through curriculum learning and entropy minimization.

With the filtered pseudo-label, the unscribbled pixel loss is defined as the following Equation 3.

$$\mathcal{L}_{up}(x, y_n) = -\frac{1}{|\Omega_g|}$$

[Equation 3]

$$\sum_{j \in \Omega_g} [\mathbb{1}(y_n > \tau)\log(f(x; \theta_i)) + \mathbb{1}((1 - y_n) > \tau)\log(1 - f(x; \theta_i))]$$

Here, $\Omega_g = \{g | g \in (\max(y_n, 1-y_n) > \tau), g \notin \Omega_s\}$, which is a set of generated label pixels, and $\tau$ is the consistency threshold. Formally, at iteration I, $L_{up}$ is calculated with $(x, y_n)$. Here, $n = \lfloor i/\gamma \rfloor + 1$. The total loss is then defined as the combination of the scribbled loss $L_{sp}$ and the unscribbled loss $L_{up}$ with the relative weight as shown in the following Equation 4.

$$\mathcal{L}_{total}(x, s, y_n) = \mathcal{L}_{sp}(x, s) + \lambda \mathcal{L}_{up}(x, y_n)$$

[Equation 4]

The EMA method described above is also applied during this training process.

Hereinafter, the results of the experiment performed to validate the performance of the present disclosure will be described.

To begin with, the performance of the present disclosure is demonstrated using three different cell image datasets. The first set, MoNuSeg [Kumar, N., Verma, R., Sharma, S., Bhargava, S., Vahadane, A., Sethi, A.: A dataset and a technique for generalized nuclear segmentation for computational pathology. IEEE transactions on medical imaging 36(7), 1550-1560 (2017)], includes 30 1000×1000 histopathology images acquired from multiple sites covering diverse nuclear appearances.

A 10-fold cross-validation is conducted for the MoNuSeg dataset. The second data set, BBBC038v1 [Caicedo, J. C., Goodman, A., Karhohs, K. W., Cimini, B. A., Ackerman, J., Haghighi, M., Heng, C., Becker, T., Doan, M., McQuin, C., et al.: Nucleus segmentation across imaging experiments: the 2018 Data Science Bowl. Nature methods 16(12), 1247-1253 (2019)], which is known as Data Science Bowl 2018, is a set of nuclei 2D images.

For the experiment, the stage 1 training dataset, which is fully annotated, is used and further divided into three main types, including 542 fluorescence (DSB-Fluo) images of various sizes, 108 320×256 histopathology images (DSB-Histo), 16 bright-field 1000×1000 (DSB-BF) images.

Each dataset is split into training, validation and test sets, with ratios of 60%, 20%, 20%, respectively. EM is an internally collected serial-section electron microscopy image dataset of a larval zebrafish. In the experiment, three sub-volumes of either 512×512×512 or 512×512×256 in size are used. The size of the testing volume is 512×512×512.

The scribbles of MoNuSeg and DSB are manually drawn by referencing the full segmentation labels. To ensure the convenience of scribbles, images are annotated up to 256×256 within 1 min, 512×512 within 2 min, and 1024×1024 within 4 min. For the EM dataset, the scribble annotation is generated by the scribble generation algorithm of [Wu, W., Qi, H., Rong, Z., Liu, L., Su, H.: Scribble-Supervised Segmentation of Aerial Building Footprints Using Adversarial Learning. IEEE Access 6, 58898-58911 (2018)] with a 10% ratio.

Figure 4:
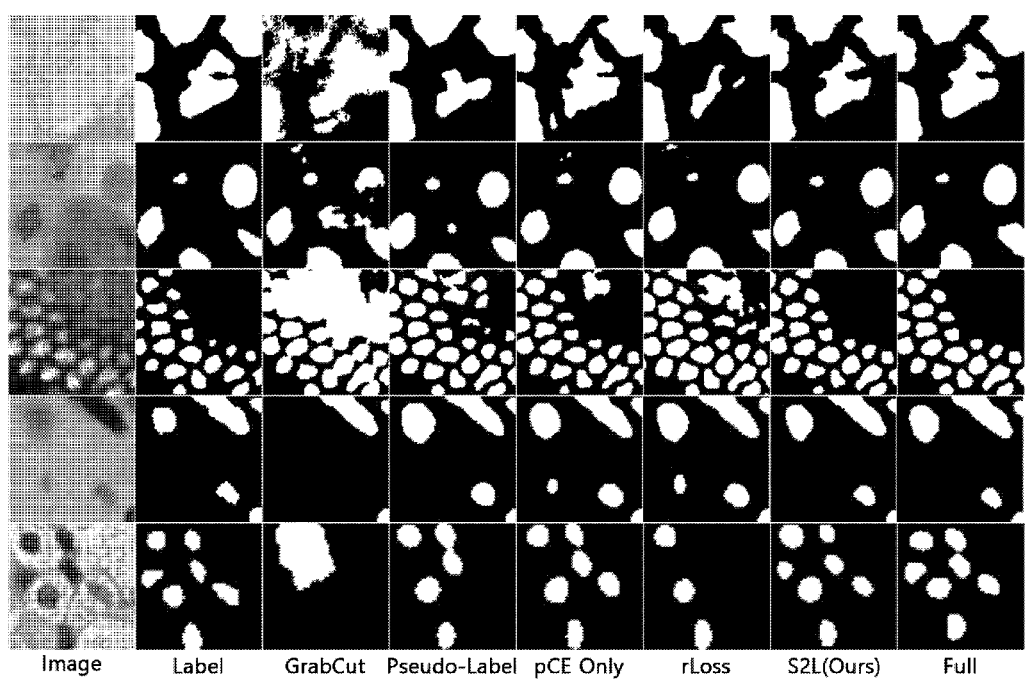
FIG. 4 is a diagram showing the results of qualitative comparison between the present disclosure and the existing technology to demonstrate the efficacy of the present disclosure.

FIG. 4 is a diagram showing the results of qualitative comparison between the present disclosure and the existing technology to demonstrate the efficacy of the present disclosure, and from the top to the bottom, EM, DSB-BF, DSB-Fluo, DSB-Histo and MoNuSeg are shown.

The baseline network of the present disclosure is U-Net with ResNet-50 encoder. For comparison with [Qu, H., Wu, P., Huang, Q., Yi, J., Riedlinger, G. M., De, S., Metaxas, D. N.: Weakly supervised deep nuclei segmentation using points annotation in histopathology images. In: International Conference on Medical Imaging with Deep Learning. pp. 390-400 (2019)] in histopathology experiments (MoNuSeg, DSB-Histo), ResNet-34 is used for the encoder.

The network is initialized with pre-trained parameters, and RAdam [Liu, L., Jiang, H., He, P., Chen, W., Liu, X., Gao, J., Han, J.: On the variance of the adaptive learning rate and beyond. arXiv preprint arXiv:1908.03265 (2019)] is used for all experiments. To regularize the network, conventional data augmentation methods, such as cropping, flipping, rotation, shifting, scaling, brightness change and contrast changes, are used.

The hyper-parameters used for the model of the present disclosure are as follows: Consistency threshold $\tau=0.8$; EMA alpha $\alpha=0.2$; ensemble momentum $\gamma=5$; $L_{up}$'s weight $\lambda=0.5$; warm-up epoch Ew=100. For the MoNuSeg dataset (which is much noisier than other datasets), $\tau=0.95$ and $\alpha=0.1$ are used to cope with noisy labels.

For validation, the performance of semantic segmentation using the Intersection Over Union (IoU) and the performance of instance segmentation is evaluated using mean Dice-coefficient (mDice) used in [Nishimura, K., Bise, R., et al.: Weakly Supervised Cell Instance Segmentation by Propagating from Detection Response. In: International Conference on Medical Image Computing and Computer-Assisted Intervention. pp. 649-657. Springer (2019)]. The following table 1 shows the quantitative results of various cell image modalities, and the numbers represent accuracy in the format of IoU[mDice].

TABLE 1

| Label | Method | EM | DSB-BF | DSB-Fluo | DSB-Histo | MoNuSeg |
|---|---|---|---|---|---|---|
| Scribble | GrabCut | 0.5288 | 0.7328 | 0.8019 | 0.6969 | 0.1534 |
| | | [0.6066] | [0.7207] | [0.7815] | [0.5961] | [0.0703] |
| | Pseudo-Label | 0.9126 | 0.6177 | 0.8109 | 0.7888 | 0.6113 |
| | | [0.9096] | [0.6826] | [0.8136] | [0.7096] | [0.5607] |
| | pCE Only | 0.9000 | 0.7954 | 0.8293 | 0.7804 | 0.6319 |
| | | [0.9032] | [0.7351] | [0.8375] | [0.7173] | [0.5706] |
| | rLoss | 0.9108 | 0.7993 | 0.8334 | 0.7873 | 0.6337 |
| | | [0.9100] | [0.7280] | [0.8394] | [0.7177] | [0.5789] |
| | S2L (Ours) | 0.9208 | 0.8236 | 0.8426 | 0.7970 | 0.6408 |
| | | [0.9167] | [0.7663] | [0.8443] | [0.7246] | [0.5811] |
| Point | Qu | — | — | — | 0.5544 | 0.6099 |
| | | | | | [0.7204] | [0.7127] |
| Full | Full | 0.9298 | 0.8774 | 0.8688 | 0.8134 | 0.7014 |
| | | [0.9149] | [0.7879] | [0.8390] | [0.7014] | [0.6677] |

Additionally, to compare the present disclosure with other methods, the present disclosure is compared with the network trained with full segmentation annotation, scribble annotation (pCE only) and the segmentation proposal from Grab-Cut. To demonstrate the efficacy of the label filtering with consistency, it is compared to pseudo labeling.

The pixels for which the probability of prediction is over threshold $\tau$ are assigned to be a pseudo-label, where $\tau$ is the same as the setting in the present disclosure. The present disclosure is also compared to Regularized Loss (rLoss), which integrates the DenseCRF into the loss function. The hyper-parameters of rLoss are $\sigma XY=100$ and $\sigma RGB=15$.

Table 1 shows the quantitative comparison of the present disclosure with several representative methods. Overall, the present disclosure outperforms all methods on both IoU and mDice quality metrics.

The present disclosure achieves even higher mDice accuracy compared to the full method (i.e., trained using full segmentation labels) on EM, DSB-BF and DSB-Histo datasets. Additionally, MoNuSeg dataset contains many small cluttering cells, which are challenge to separate individually.

However, the present disclosure shows outstanding instance segmentation results in this case, too.

Grab-Cut's [Lin, D., Dai, J., Jia, J., He, K., Sun, J.: Scribblesup: Scribble-supervised convolutional networks for semantic segmentation. In: Proceedings of the IEEE Conference on Computer Vision and Pattern Recognition. pp. 3159-3167 (2016)] segmentation proposal and the pseudo-label [Lee, D. H.: Pseudo-label: The simple and efficient semi-supervised learning method for deep neural networks. In: Workshop on challenges in representation learning, ICML. vol. 3, p. 2 (2013)] are erroneous.

Thus, training with these erroneous segmentation labels impairs the performance of the method. Qu et al.'s method [Qu, H., Wu, P., Huang, Q., Yi, J., Riedlinger, G. M., De, S., Metaxas, D. N.: Weakly supervised deep nuclei segmentation using points annotation in histopathology images. In: International Conference on Medical Imaging with Deep Learning. pp. 390-400 (2019)] performs well for instance-level segmentation on MoNuSeg dataset, however, it performs worse on DSB-histo dataset. Since Qu et al.'s method uses a clustering label that has circular shape cell label, it is hard to segment the non-circular cell.

Learning with pCE [Tang, M., Perazzi, F., Djelouah, A., Ben Ayed, I., Schroers, C., Boykov, Y.: On regularized losses for weakly-supervised cnn segmentation. In: Proceedings of the European Conference on Computer Vision (ECCV). pp. 507-522 (2018)] shows stable results on various datasets. However, due to learning using only scribbles, the method fails to correctly predict boundary accurately as in the present disclosure.

rLoss [Tang, M., Perazzi, F., Djelouah, A., Ben Ayed, I., Schroers, C., Boykov, Y.: On regularized losses for weakly-supervised cnn segmentation. In: Proceedings of the European Conference on Computer Vision (ECCV). pp. 507-522 (2018)] outperforms most of the previous methods, but the present disclosure generally shows better results.

Additionally, it is observed that leveraging consistency by averaging predictions is crucial to generate robust pseudo-labels. The present disclosure, Scribble2Label's results also confirm that using pseudo label together with scribbles is effective to generate accurate boundaries, comparable to the ground-truth segmentation label.

To demonstrate the effect of amount of scribble annotations, i.e., the robustness of the method over various levels of scribble details, an experiment is conducted using scribbles automatically generated using a similar method by Wu et al. [Wu, W., Qi, H., Rong, Z., Liu, L., Su, H.: Scribble-Supervised Segmentation of Aerial Building Footprints Using Adversarial Learning. IEEE Access 6, 58898-58911 (2018)] (i,e., foreground and background regions are skeletonized and sampled).

The target dataset is DSB-Fluo, and various amounts of scribbles, i.e., 10%, 30%, 50%, 100% of the skeleton pixels extracted from the full segmentation labels (masks) are automatically generated.

The following table 2 summarizes the results with different levels of scribble details. The numbers represent accuracy in the format of IoU [mDice].

TABLE 2

| Method | 10% | 30% | 50% | 100% | Manual |
| --- | --- | --- | --- | --- | --- |
| GrabCut | 0.7131 [0.7274] | 0.8153 [0.7917] | 0.8244 [0.8005] | 0.8331 [0.8163] | 0.8019 [0.7815] |
| Pseudo-Label | 0.7920 [0.8086] | 0.7984 [0.8236] | 0.8316 [0.8392] | 0.8283 [0.8251] | 0.8109 [0.8136] |

TABLE 2-continued

| Method | 10% | 30% | 50% | 100% | Manual |
| --- | --- | --- | --- | --- | --- |
| pCE Only | 0.7996 [0.8136] | 0.8180 [0.8251] | 0.8189 [0.8204] | 0.8098 [0.8263] | 0.8293 [0.8375] |
| rLoss | 0.8159 [0.8181] | 0.8251 [0.8216] | 0.8327 [0.8260] | 0.8318 [0.8369] | 0.8334 [0.8394] |
| S2L(Ours) | 0.8274 [0.8188] | 0.8539 [0.8407] | 0.8497 [0.8406] | 0.8588 [0.8443] | 0.8426 [0.8443] |
| Full | | | 0.8688 [0.8390] | | |

The present disclosure, Scribble2Label, generates stable results in both the semantic metric and instance metric from sparse scribbles to abundant scribbles.

The present disclosure shows very robust results over various scribble amounts. The present disclosure performs comparable to using full segmentation masks only with 30% of skeleton pixels.

The present disclosure proposes a simple but effective scribble-supervised learning method that combines pseudo-labeling and label-filtering with consistency. Unlike the existing methods, the present disclosure demonstrates highly-accurate segmentation performance on various datasets and at different levels of scribble detail without extra segmentation processes or additional model parameters. Accordingly, the present disclosure can effectively avoid time-consuming and labor-intensive manual label generation, which is a major bottleneck in image segmentation.

Figure 5:
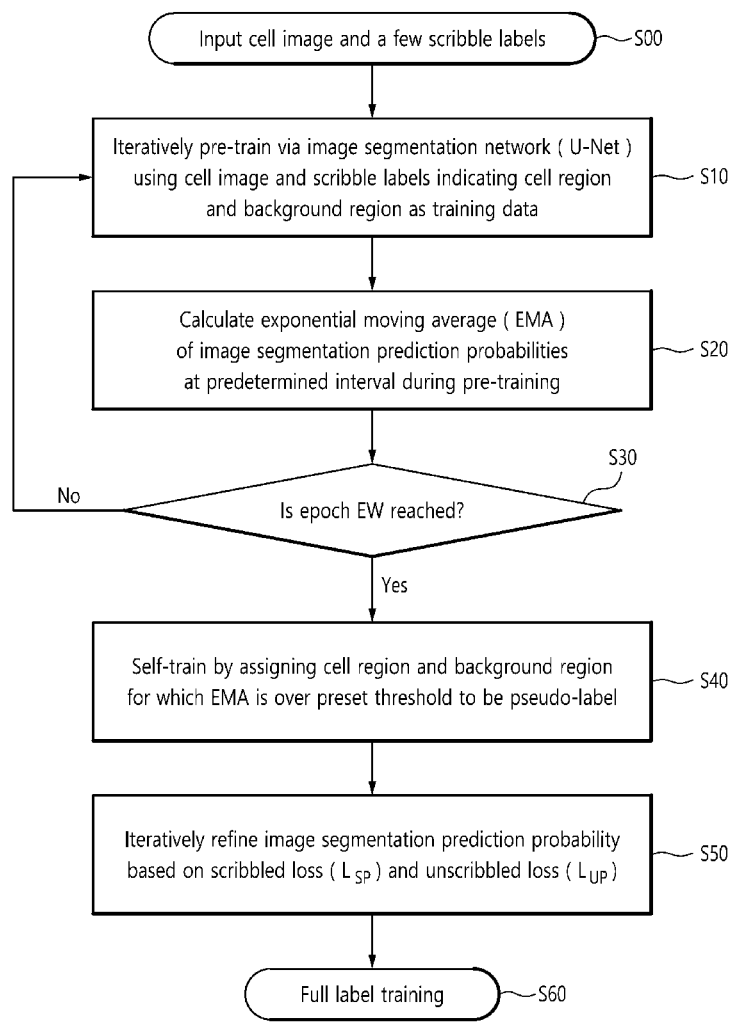
FIG. 5 is a flowchart of a cell image segmentation method using scribble labels according to an embodiment of the present disclosure.

FIG. 5 is a flowchart of a cell image segmentation method using scribble labels according to an embodiment of the present disclosure.

The cell image segmentation method using scribble labels according to this embodiment may be performed by the same process as the overview of FIG. 1 in substantially the same configuration as the device 10 of FIG. 2.

Accordingly, the same element as the device 10 of FIGS. 1 and 2 is given the same reference sign, and a repetitive description is omitted herein. Additionally, the cell image segmentation method using scribble labels according to this embodiment may be performed by the software (application) for performing cell image segmentation using scribble labels.

The present disclosure proposes a cell segmentation framework exploiting only a handful of scribble annotations without full segmentation labels. To this end, the present disclosure combines pseudo labeling and label filtering to generate reliable labels from weak supervision, and leverages the consistency of predictions by iteratively averaging the predictions to improve pseudo labels.

The present disclosure uses scribble annotations as in the existing scribble-supervised learning methods, but proposes the combination of pseudo labeling and label filtering to progressively generate full training labels from a few scribble annotations. By doing this, it is possible to effectively remove noise in pseudo labels and improve prediction accuracy.

Additionally, the present disclosure introduces a novel iterative segmentation network training process that automatically generates training labels via weak-supervision using only a small set of manual scribbles, which significantly reduces the manual effort in generating training labels. Additionally, the present disclosure exploits the consistency by combining pseudo labeling and label filtering. Through this, it is possible to generate reliable training labels which results in a highly accurate and robust performance.

Referring to FIG. 5, the cell image segmentation method using scribble labels according to this embodiment includes iteratively pre-training via an image segmentation network (U-Net) (step S10) using a cell image and scribble labels indicating a cell region and a background region as training data (step S00).

The scribbled pixels indicating the cell region and the background region may be input by a user, and may include pixels of 10% or less of the cell image.

The EMA of image segmentation prediction probabilities is calculated at a predetermined interval during the pre-training (step S20).

For unlabeled pixels, labels are automatically generated using the EMA of image segmentation prediction probabilities, and an average is computed every γ epoch which is the interval of the prediction ensemble process of the scribbled loss $L_{sp}$ and the unscribbled loss $L_{up}$.

At the beginning of the warm-up stage, there are only a small set of user-drawn scribbles for input training data. During the first few iterations (warm-up stage), the model is trained only using the given scribbles, and the average of predictions which can be used in the following stage is generated.

Here, the given scribbles are a subset of the corresponding mask annotation. By ignoring unscribbled pixels, the proposed network is trained with the cross entropy loss as shown in Equation 1. Additionally, the EMA of the predictions over the training process is periodically calculated as shown in Equation 2.

In the pre-training stage, the scribbled loss $L_{sp}$ is predicted by applying the standard cross entropy loss to only labeled pixels, and training is iteratively performed until a preset epoch is reached (step S30).

Self-training is performed by assigning the cell region and the background region for which the EMA of image segmentation prediction probabilities is over a preset threshold to be a pseudo-label (step S40).

The image segmentation prediction probability is iteratively refined based on the scribbled loss $L_{sp}$ obtained through a result of the training and the unscribbled loss $L_{up}$ (step S50). A relative weight may be applied to the unscribbled loss $L_{up}$.

The step S40 is a filtering process of removing noise in pseudo labels through pseudo labeling and label filtering, and may periodically predict the unscribbled loss $L_{up}$.

The average of the predictions can be obtained after the warm-up stage. This can be used for generating a reliable pseudo-label of unscribbled pixels. For filtering the pseudo-label, the average is used.

The pixels with consistently the same result are one-hot encoded and used as a label for unscribbled pixels with standard cross entropy. Using only reliable pixels and making these one-hot encoded progressively provide benefits through curriculum learning and entropy minimization.

With the filtered pseudo-label, the unscribbled pixel loss is defined as Equation 3. The total loss is then defined as the combination of the scribbled loss $L_{sp}$ and the unscribbled loss $L_{up}$ with the relative weight as shown in Equation 4.

Through this, full labels are generated from a few scribble labels during training (step S60).

According to the cell image segmentation method using scribble labels according to the present disclosure, cell segmentation with high reliability using only scribble labels is proposed, thereby dramatically reducing the time and cost required to build datasets. Additionally, the present disclosure does not use an additional image processing method, thereby reducing the computational costs.

The cell image segmentation method using scribble labels may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

The present disclosure is drawn towards simple cell segmentation and analysis software in microscopy image through scribble labels, and can be used usefully in hospitals and labs in the biomedical field for prognosis analysis using observed cell characteristics. In particular, since high costs are not incurred to build datasets, it is expected to be widely used in small hospitals and labs.

DETAILED DESCRIPTION OF MAIN ELEMENTS

10: Cell image segmentation device using scribble labels
110: Warm-up unit
130: Probability prediction unit
150: Self-training unit
170: Refinement unit

What is claimed is:

1. A cell image segmentation method using scribble labels, comprising:
   iteratively pre-training via an image segmentation network (U-Net) using a cell image and scribble labels indicating a cell region and a background region as training data;
   calculating an exponential moving average (EMA) of image segmentation prediction probabilities at a predetermined interval during the pre-training;
   self-training by assigning the cell region and the background region for which the EMA of image segmentation prediction probabilities is over a preset threshold to be a pseudo-label; and
   iteratively refining the image segmentation prediction probability based on a scribbled loss ($L_{sp}$) obtained through a result of the training and an unscribbled loss ($L_{up}$).

2. The cell image segmentation method using scribble labels according to claim 1, wherein the pre-training includes predicting the scribbled loss ($L_{sp}$) by applying a standard cross entropy loss to only labeled pixels.

3. The cell image segmentation method using scribble labels according to claim 2, wherein the pre-training is iteratively performed until a preset epoch is reached.

4. The cell image segmentation method using scribble labels according to claim 1, wherein in the pre-training step, scribbled pixels indicating the cell region and the background region include pixels of 10% or less of the cell image.

5. The cell image segmentation method using scribble labels according to claim 1, wherein calculating the EMA of image segmentation prediction probabilities includes automatically generating labels for unlabeled pixels using the EMA of image segmentation prediction probabilities.

6. The cell image segmentation method using scribble labels according to claim 1, wherein calculating the EMA of image segmentation prediction probabilities includes averaging every $\gamma$ epoch which is an interval of a prediction ensemble process of the scribbled loss ($L_{sp}$) and the unscribbled loss ($L_{up}$).

7. The cell image segmentation method using scribble labels according to claim 1, wherein the self-training includes removing noise in pseudo labels through pseudo labeling and label filtering.

8. The cell image segmentation method using scribble labels according to claim 1, wherein the self-training includes periodically predicting the unscribbled loss ($L_{up}$).

9. The cell image segmentation method using scribble labels according to claim 1, wherein iteratively refining the image segmentation prediction probability includes applying a relative weight to the unscribbled loss ($L_{up}$).

10. A non-transitory computer-readable storage medium having recorded thereon a computer program for performing the cell image segmentation method using scribble labels according to claim 1.

11. A cell image segmentation device using scribble labels, comprising:
    a warm-up unit to iteratively pre-train via an image segmentation network (U-Net) using a cell image and scribble labels indicating a cell region and a background region as training data;
    a probability prediction unit to calculate an exponential moving average (EMA) of image segmentation prediction probabilities at a predetermined interval during the pre-training;
    a self-training unit to self-train by assigning the cell region and the background region for which the EMA of image segmentation prediction probabilities is over a preset threshold to be a pseudo-label; and
    a refinement unit to iteratively refine the image segmentation prediction probability based on a scribbled loss ($L_{sp}$) obtained through a result of the training and an unscribbled loss ($L_{up}$).

* * * * *